UNITED STATES PATENT OFFICE.

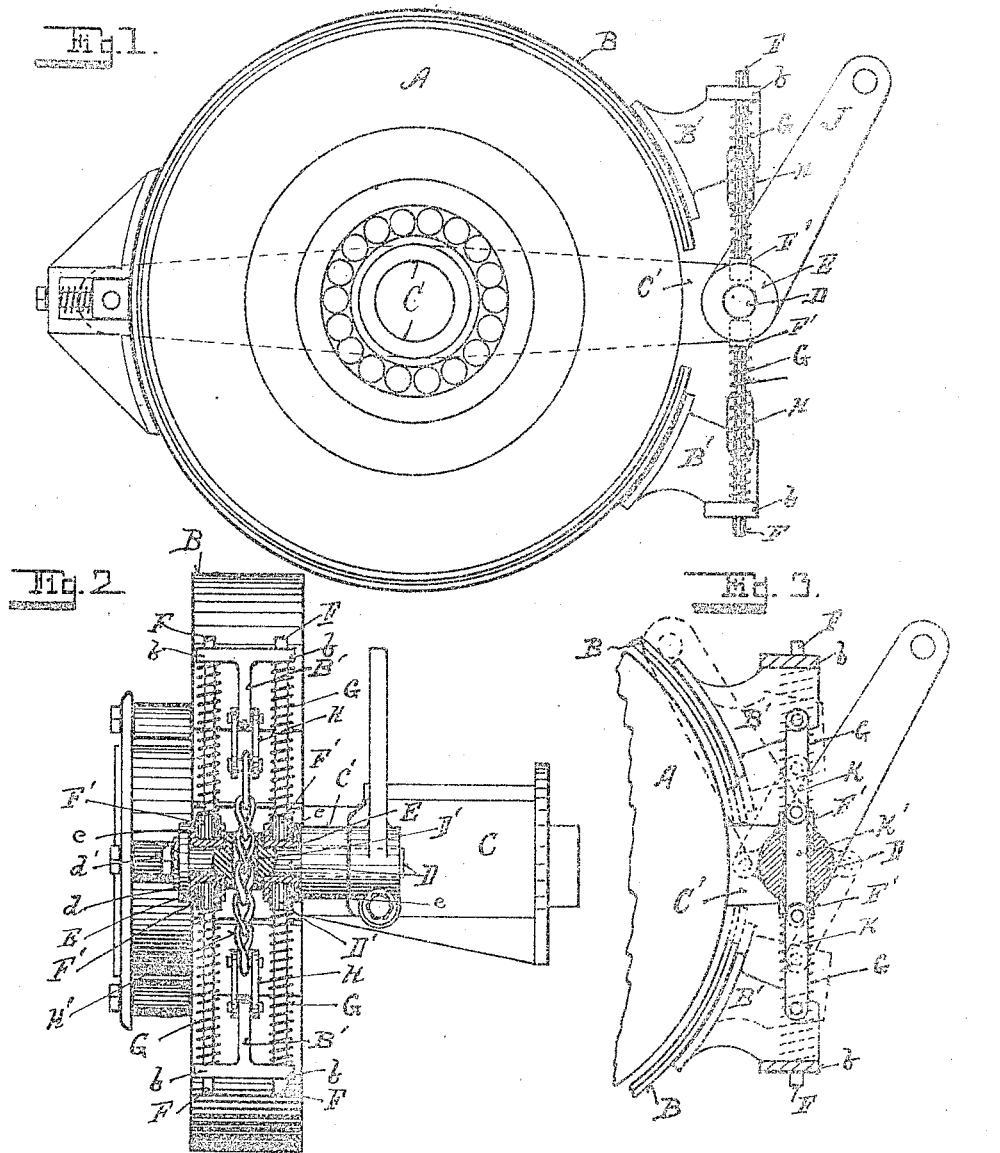

EDWIN DE H. CALDWELL, OF DUNKIRK, NEW YORK.

BRAKE-GEAR FOR MOTOR-VEHICLES.

1,124,291. Specification of Letters Patent. Patented Jan. 12, 1915.

Application filed February 24, 1914. Serial No. 320,640.

*To all whom it may concern:*

Be it known that I, EDWIN DE H. CALDWELL, a citizen of the United States, residing at Dunkirk, in the county of Chautauqua and State of New York, have invented certain new and useful Improvements in Brake-Gear for Motor-Vehicles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to brake-gear for motor vehicles, and has for its object the construction of gear whereby the strains upon the upper and lower halves of a brake band will be equalized.

The features of my invention will appear hereinafter in the specification and claims, and are illustrated in the accompanying drawings in which:—

Figure 1, is a side view in elevation of motor vehicle brake mechanism, embodying my invention. Fig. 2, is an edgewise view of the same. Fig. 3, shows a modification of the same.

In these drawings A, indicates a motor-vehicle brake drum; B, indicates a brake-band, and B', indicates bracket levers secured on the band B, adjacent to each end of the band B.

C, indicates a portion of the rear axle housing of a motor vehicle, and C', indicates a bracket arm on said housing for supporting the brake-gear hereafter described. Mounted in a suitable bearing in the bracket arm C', is a rock-shaft D, having a transverse opening D', therethrough, and rotatably mounted on said shaft on each side of said opening D', there is a collar E, which collars are provided with oppositely disposed radial openings e, in the peripheries thereof. The bracket-levers B', are provided with laterally extending ears b. In these ears b, are slidably placed rods F, which are provided at their inner ends with shoulders F', which enter the oppositely disposed radial openings e, in the collars E, on the rock-shaft D. On these rods F, between the ears b, and the shoulders F', I place springs G. To the bracket levers B', I pivot links H, and to the ends of the links H, I secure a chain H', (see Fig. 2) which chain passes through the opening D', in the rock-shaft D. On one end of the rock-shaft D, I secure a washer d, by means of a tap-bolt d', to retain the collar E, on that end of the rock-shaft D. On the opposite end of the rock-shaft D, I place an operating lever J.

In Fig. 3, I illustrate an alternative construction in which I do not use the chain H', hereinbefore described, substituting therefor links K, which are pivoted to the lever-brackets B', and through the transverse opening D', in the shaft D, I place a slidable link K', the ends of which are pivoted to the links K. In both forms, however, the flexible connection between the two bracket-levers B', are adapted to slide freely through the opening D', in the rock-shaft D.

In operation, when the lever J, is moved to the position thereof shown by broken lines in Fig. 3, the flexible connecting means between the bracket-levers B', is shortened by the partial rotation of the rock-shaft D, thereby causing the bracket-levers B', to approach each other and tighten the brake-band upon the brake-drum A, and when said lever is released, the springs G, force the lever-brackets B', apart thereby to disengage the band B, from the drum A; the action of the springs also retaining the rods F, seated in the radial openings e, in the collars E.

Having thus fully described the construction and operation of my invention, what I claim as new and desire to secure by Letters-Patent is:—

1. In a device of the character described, a drum, an open band around the periphery thereof, bracket-levers secured adjacent to the ends of said band, a bracket-arm, a rock-shaft having a transverse opening therethrough mounted in said bracket-arm, a flexible connecting means between said bracket-levers and through the transverse opening in said rock-shaft, spring mechanism to move said bracket-levers apart, and means to rock said rock-shaft, substantially as described.

2. In a device of the character described, a drum, an open band around said drum, a rock-shaft having an opening therethrough, a flexible element passed through said opening, means to connect said flexible element with the end portions of said open band, spring mechanism adapted to expand said band, and means to operate said rock-shaft, substantially as set forth.

3. In a device of the character described, a drum, an open band around said drum, a rock-shaft having an opening therethrough, means to support said rock-shaft, collars on said rock-shaft, bracket levers secured on said open band, spring mechanism between said bracket-arms and said collars adapted to expand said band, a flexible connection secured to said bracket-levers, and passing through the opening in said rock-shaft, and means to operate said rock-shaft, substantially as set forth.

4. In a device of the character described, a drum, an open band around the same, bracket-levers secured adjacent to the ends of said open band, ears on said bracket-levers, a rock-shaft having a transverse opening therethrough, means to support the same, collars on said rock-shaft having openings in the periphery thereof, rods stepped in said openings and extending through the ears on said bracket-levers, shoulders on said rods, springs on said rods between said shoulders and said ears, a flexible connection between said bracket-levers and passing through the opening in said rock-shaft, and means to operate said rock-shaft, substantially as set forth.

In testimony whereof I affix my signature, in presence of two witnesses.

EDWIN DE H. CALDWELL.

Witnesses:
 EDWARD MADIGAN,
 T. H. LUND.